United States Patent [19]

Fork

[11] 4,194,332
[45] Mar. 25, 1980

[54] ELECTRICAL WIRING DISTRIBUTION SYSTEM

[75] Inventor: Frank W. Fork, Allison Park, Pa.

[73] Assignee: H. H. Robertson Company, Pittsburgh, Pa.

[21] Appl. No.: 874,537

[22] Filed: Feb. 2, 1978

[51] Int. Cl.² ............................................. E04B 5/48
[52] U.S. Cl. ........................................ 52/220; 174/96
[58] Field of Search ................... 52/220, 221; 174/48, 174/49, 96, 98; 138/105 R

[56] References Cited

U.S. PATENT DOCUMENTS

| | | | |
|---|---|---|---|
| 1,968,121 | 1/1935 | Seargent | 52/221 |
| 2,978,840 | 4/1961 | Tatsch | 52/220 |
| 3,453,791 | 7/1969 | Fork | 174/49 |
| 3,592,956 | 7/1971 | Fork | 174/49 |
| 3,903,666 | 9/1975 | Fork | 52/221 |
| 3,932,696 | 1/1976 | Fork | 52/221 |
| 4,065,896 | 1/1978 | Penczak | 52/220 |

Primary Examiner—James A. Leppink
Assistant Examiner—Henry E. Raduazo
Attorney, Agent, or Firm—Harry B. Keck; George E. Manias

[57] ABSTRACT

A wiring distribution system for fill-on-slab or fill-on-grade floor constructions, including an uninterrupted main unit providing main passageways and at least one laterally extending feeder unit providing feeder passageways supported on a substructure (-slab or -grade). A housing having a removable cover encloses a full-width segment of the main unit and an end segment of the feeder unit. A covering layer of concrete (fill-) surrounds the housing. A partition divides the interior of the enclosure into two compartments, a first communicating with one feeder passageway and a second communicating with the other feeder passageways. The main unit presents at least one common lengthwise trough extending through and beyond the opposite sides of the enclosure. First and second capping means enclose those portions of the common lengthwise trough on opposite sides of the enclosure to provide substantially unobstructed additional main passageways communicating with the second compartment. Isolator means within the housing isolates the first compartment from the common lengthwise trough. The arrangement is such that high voltage wiring extending through a designated main passageway may be fed through the first compartment to a corresponding feeder passageway whereas low voltage wiring, such as telephone and signal wiring, extending through others of the main passageways may be fed through the second compartment to corresponding feeder passageways.

14 Claims, 18 Drawing Figures

ELECTRICAL WIRING DISTRIBUTION SYSTEM

BACKGROUND OF THE INVENTION

1. Field of the Invention

This invention relates to an electrical wiring distribution system, and more particularly to an electrical wiring distribution system for fill-on-slab or fill-on-grade floor constructions.

2. Description of the Prior Art

Floor structures are known which incorporate corrugated sheets laid in edgeoverlapped relation and supported on structural beams. Certain of the corrugated sheets include relatively wide channels which are enclosed by the addition of closure elements to provide electrical passageways. Header ducts are disposed above, extend transversely of the electrical passageways, and communicate with the electrical passageways. A covering layer of concrete is supported by the corrugated sheets. Outlet tubes provide access to the conductors in the electrical passageways and in the header ducts from the finished floor level. Such a floor structure is disclosed in U.S. Pat. No. 3,912,848 (LEE et al).

Cellular metal raceway sections are known which provide two parallel cells separated by an intermediate trough and wherein cover strips and chamber-defining members enclose the intermediate trough to form an additional unobstructed wiring passageway. The chamber-defining member comprises an enclosure which spans across the trough and the adjacent cells and communicates with the cells through openings in the cell crests. Outlet openings in the top wall of the enclosure provide access to the interior of the enclosure and to the trough from the finished floor level. A typical reinforced floor structure may contain a plurality of the cellular metal raceway sections arranged in spaced-apart generally parallel relationship. An electrical trench header may be provided which extends transversely across the tops of the metal cellular raceway sections and which communicates with the cells for distributing electrical wiring throughout the floor area. Such an arrangement is disclosed in U.S. Pat. No. 3,592,956 (FORK).

An electrical wiring distribution system for building floors is known which includes an uninterrupted main unit consisting of a metal cellular raceway section providing spaced-apart generally parallel main passageways and at least one laterally extending feeder unit consisting of a metal cellular raceway section providing spaced-apart generally parallel feeder passageways. A housing is provided which encloses a segment of the main unit and an end segment of the feeder unit. The housing is compartmented so as to restrict communication between each main passageway and a corresponding feeder passageway. Such an arrangement is disclosed in U.S. Pat. No. 3,453,791 (FORK).

The LEE et al '848 and the FORK '956 arrangements incorporate wiring passageways at two different levels and necessarily result in relatively thick floor structures.

In the FORK '791 arrangement, the vertical distance between the cover plate and the top of the main unit must be large to accommodate large diameter telephone wiring. Hence a relatively thick covering layer of concrete is required.

SUMMARY OF THE INVENTION

The principal object of this invention is to provide an improved electrical wiring distribution system for use in fill-on-slab or fill-on-grade floor constructions.

Another object of this invention is to provide an electrical wiring distribution system through which large diameter telephone wiring may be fed without approaching the minimum bending radius thereof and which requires only a shallow covering layer of concrete.

Another object of this invention is to provide an electrical wiring distribution system wherein wiring extending through designated main passageways may be readily fed to feeder passageways for distribution in a direction transverse to the main passageways.

Still another object of this invention is to provide an electrical wiring distribution system wherein high voltage wiring is entirely segregated from low voltage wiring.

The present invention constitutes an improvement over the electrical wiring distribution system disclosed and claimed in U.S. Pat. No. 3,453,791.

The present invention provides an electrical wiring distributon system for use in concrete structures, particularly fill-on-slab and fill-on-grade floor constructions. Broadly, the present electrical wiring distribution system includes an uninterrupted main unit having opposite longitudinal edges, including alternating crests and valleys connected by webs and presenting lengthwise troughs each defined by one of the valleys and the confronting webs connected thereto. At least one feeder unit extends transversely away from the main unit. The main unit and the feeder unit are supported on an upper surface presented by a substructure. The substructure may comprise a structural slab as in the case of fill-on-slab floor constructions. Alternatively, the substructure may comprise a compacted layer of stone, earth or sand covered by a vapor barrier, as in the case of fill-on-grade floor constructions. Spaced generally parallel main passageways are provided which are defined in part by the main unit. Spaced generally parallel feeder passageways are provided which are defined in part by the feeder unit and which terminate in open feeder passageway ends adjacent to one of the longitudinal edges of the main unit. A housing having a removable cover encloses a full-width segment of the main unit and the open feeder passageway ends of the feeder unit. A covering layer of concrete surrounds the housing to complete the floor construction. A partition is provided within the housing which extends transversely of the full-width segment and which divides the interior of the housing into a first compartment communicating with one of the feeder passageways and a second compartment communicating with the others of the feeder passageways. A first of the main passageways is provided with a first access opening which establishes communication with the first compartment. A second of the main passageways is provided with a second access opening which establishes communication with the second compartment. First and second capping means are provided which enclose those portions of a common lengthwise trough extending beyond opposite sides of the housing thereby to provide substantially unobstructed additional main passageways. Isolator means positioned within the housing isolates the first compartment from the common lengthwise tough. That length of the common lengthwise trough within the housing remains uncapped whereby each of the additional main passageways communicates with the second compartment.

The overall arrangement is such that high voltage wiring extending through the first of the main passageways may be fed through the first access opening and the first compartment to a corresponding feeder passageway. Low voltage wiring extending through the second of the main passageways and through the additional main passageways may be fed through the second compartment to corresponding feeder passageways.

DESCRIPTION OF THE PREFERRED EMBODIMENT(S)

Figures 1, 2, 3:
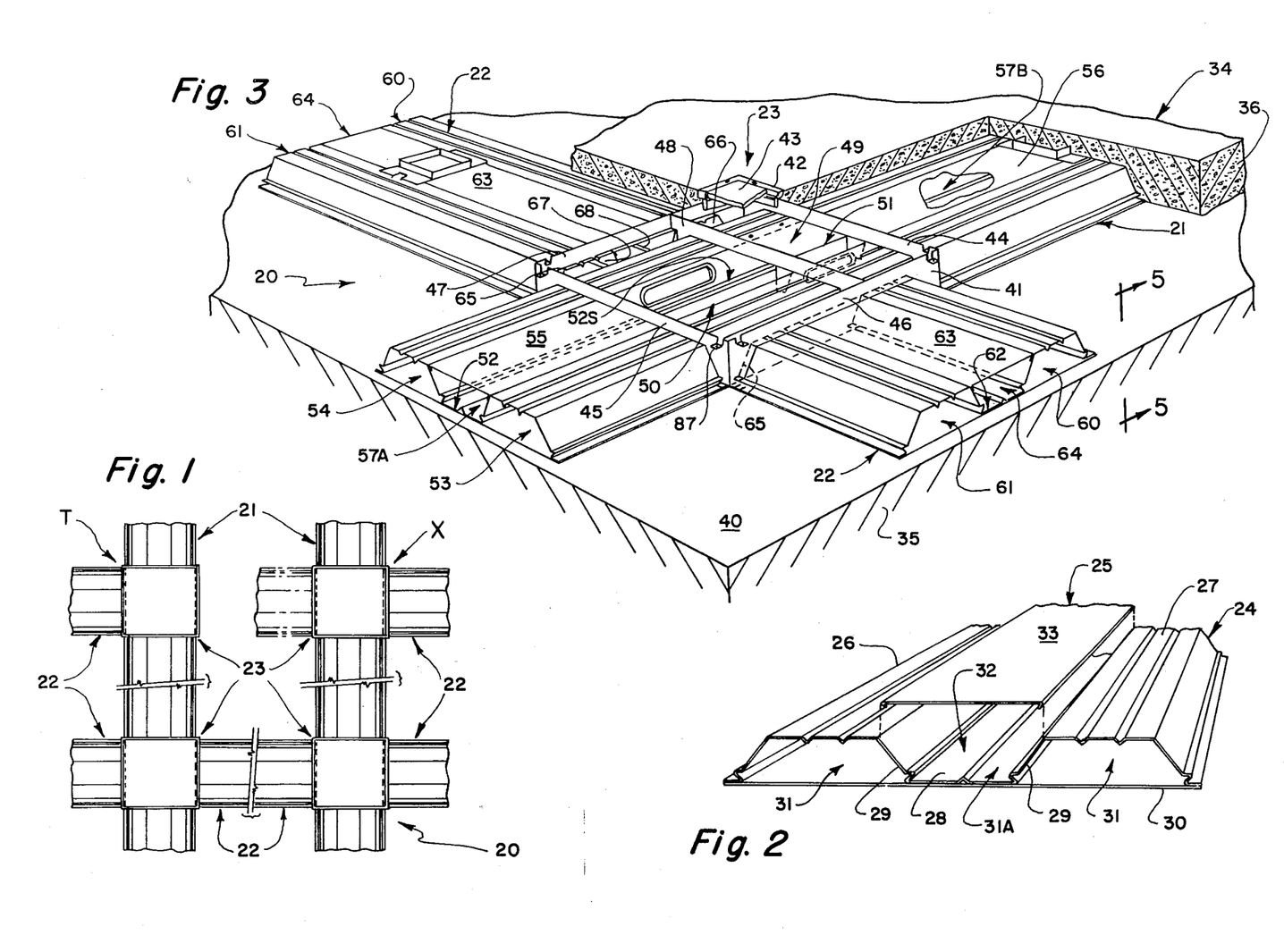
FIG. 1 is a fragmentary broken plan view illustrating an electrical wiring distribution system of this invention.
FIG. 2 is a fragmentary perspective view illustrating a metal cellular unit and capping means employed as a main unit and as a feeder unit in the distribution system of this invention.
FIG. 3 is a fragmentary perspective view illustrating a floor structure incorporating the distribution system of this invention.

FIG. 1 illustrates an electrical wiring distribution system 20 of this invention comprising a plurality of spaced-apart generally parallel main units 21 which extend uninterruptedly in one direction, spaced-apart generally parallel feeder units 22 which extend laterally of and between adjacent main units 21, and housings 23 each situated at the intersection of the main unit 21 and the feeder unit 22. The housing 23 may be employed at a T-intersection wherein one feeder unit intersects a main unit 21, and at an X-intersection wherein two feeder units 22 intersect a main unit 21.

As will become apparent, the overall arrangement of the electrical wiring distributing system 20 is such that electrical wiring of various electrical services such as telephone, power, signal and communications may extend uninterruptedly through the main units 21; other electrical wiring of the same services may extend uninterruptedly through the feeder units 22 and the intervening housings 23; and the wiring of any particular electrical service may extend from a main unit 21 into the cell of a feeder unit 22 which conveys the corresponding electrical service. The high voltage wiring is completely segregated from the low voltage wiring regardless of which direction that electrical wiring extends through the distribution system 20.

FIG. 2 illustrates a typical cellular raceway section 24 and capping means 25 which may be used as the main unit 21 and the feeder unit 22. The raceway section 24 comprises a corrugated upper metal sheet 26 including alternating crests 27 and valleys 28 connected by inclined webs 29; and a correlative lower flat metal sheet 30 secured to the upper metal sheet 26 along contiguous portions thereof to provide spaced-apart parallel passageways 31. The raceway section 24 presents at least one lengthwise trough 32 defined by one of the valleys 28 and the confronting inclined webs 29 connected thereto. The capping means 25 in the form of a sheet metal infill plate 33 of appropriate length is provided to enclose the lengthwise trough 32 thereby to provide a substantially unobstructed additional passageway 31A.

Figures 4, 5:
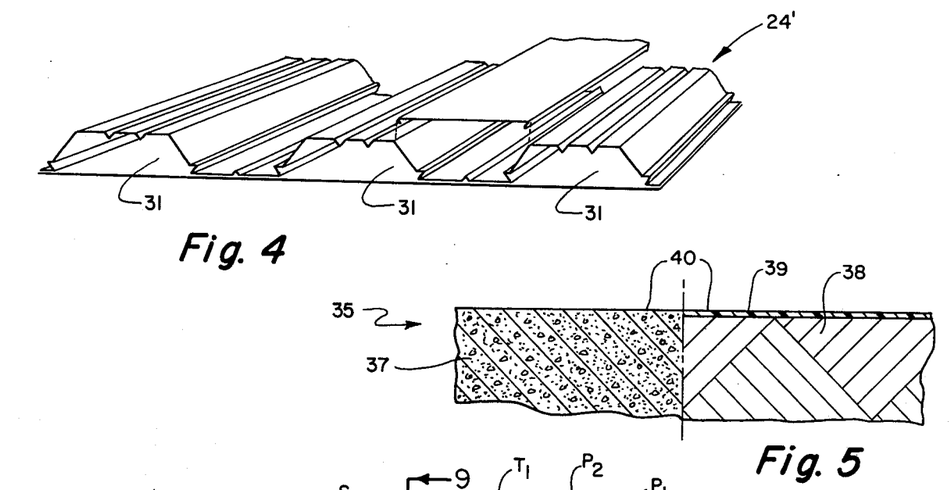
FIG. 4 is a view similar to FIG. 2 illustrating an alternative metal raceway unit.
FIG. 5 is a cross-sectional view taken along the line 5—5 of FIG. 3.

The raceway section 24 of FIG. 2 presents two passageways 31. If desired, a wider raceway section 24' such as illustrated in FIG. 4 may be provided which presents more than two passageways 31.

The raceway sections 24 and 24' typically are formed from 20 gauge (0.92 millimeter) metal coated sheet steel, are provided in lengths of up to 40 feet (12.2 meters), and have a depth (distance between the crest 27 and the lower flat sheet 30) of 2 inches (5.1 centimeters) or 3 inches (7.6 centimeters). The raceway sections 24 and 24' may have an overall width of about 21 inches (53.3 centimeters) or about 33 inches (83.8 centimeters), respectively.

FIG. 3 illustrates a typical fill-on-slab or fill-on-grade floor structure 34 incorporating the distribution system 20 of this invention. The floor structure 34 includes a substructure 35 supporting the distribution system 20 and a covering layer of concrete 36. The substructure 35 (FIG. 5) may comprise a structural slab 37 or a compacted layer 38 of stone, earth or sand covered by a vapor barrier 39. The substructure 35 presents an upper surface 40 on which the main units 21 and the feeder units 22 are supported as shown in FIG. 3.

Figure 6:
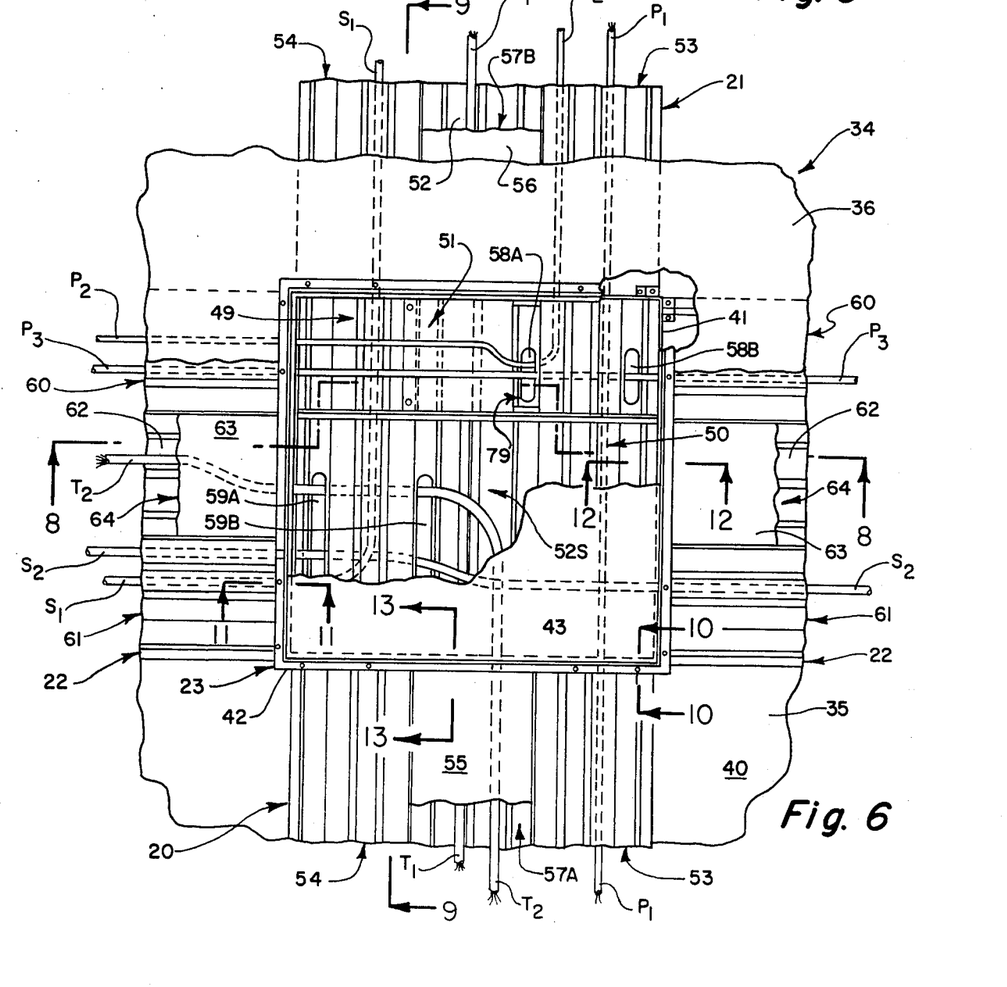
FIG. 6 is a fragmentary plan view with parts broken away to show details illustrating an X-intersection of the distributing system of this invention.

Referring to FIGS. 3 and 6, the housing 23 comprises, in general, a boundary enclosure 41, a frame means 42, and a cover plate 43—only fragments of the frame 42 and the cover plate 43 being illustrated in FIG. 3. The boundary enclosure 41 (FIG. 3) includes opposite end walls 44, 45 extending transversely across the entire width of the main unit 21, and opposite side walls 46, 47 extending transversely across the entire width of the feeder units 22. The enclosure 41 encloses a full-width segment of the main unit 21 and end segments 65 of the feeder units 22. A partition 48 extending between the opposite side walls 46, 47 divides the interior of the housing 23 into first and second compartments 49, 50. Isolator means 51 provided in the housing 23 isolates the first compartment 49 from a common lengthwise trough 52 presented by the main unit 21.

Figure 13:
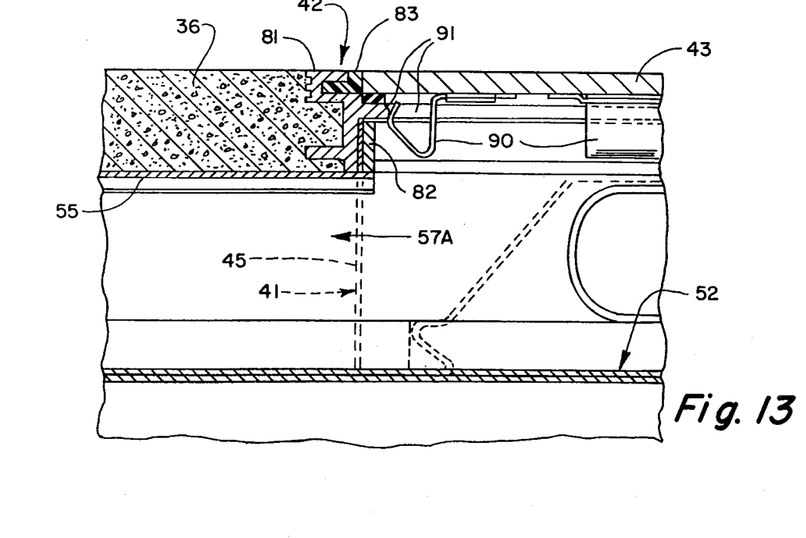
FIG. 13 is a cross-sectional view taken along the line 13—13 of FIG. 6.

It will be observed in FIGS. 3 and 6 that the main unit 21 presents first and second main passageways 53, 54 disposed on opposite sides of the common lengthwise trough 52. First and second capping means 55, 56 are provided to enclose those portions of the common lengthwise trough 52 on opposite sides of the housing 23 thereby to provide substantially unobstructed additional main passageways 57A, 57B. A trough segment 52S of the common lengthwise trough 52 is exposed in the region between the partition 48 and the end wall 45. The additional main passageways 57A, 57B communicate with the second compartment 50 through the trough segment 52S. In this embodiment, the first capping means 55 terminates just inside of the end wall 45 as shown in FIG. 13. Although not illustrated, the second capping means 56 likewise terminates just inside of the end wall 44.

The first main passageways 53 (FIG. 6) is provided with at least one and preferably two access openings 58A, 58B which establish communication with the first compartment 49. The second main passageway 54 is provided with at least one and preferably two access openings 59A, 59B which establish communication with the second compartment 50.

Figures 7, 8, 9, 10, 11:
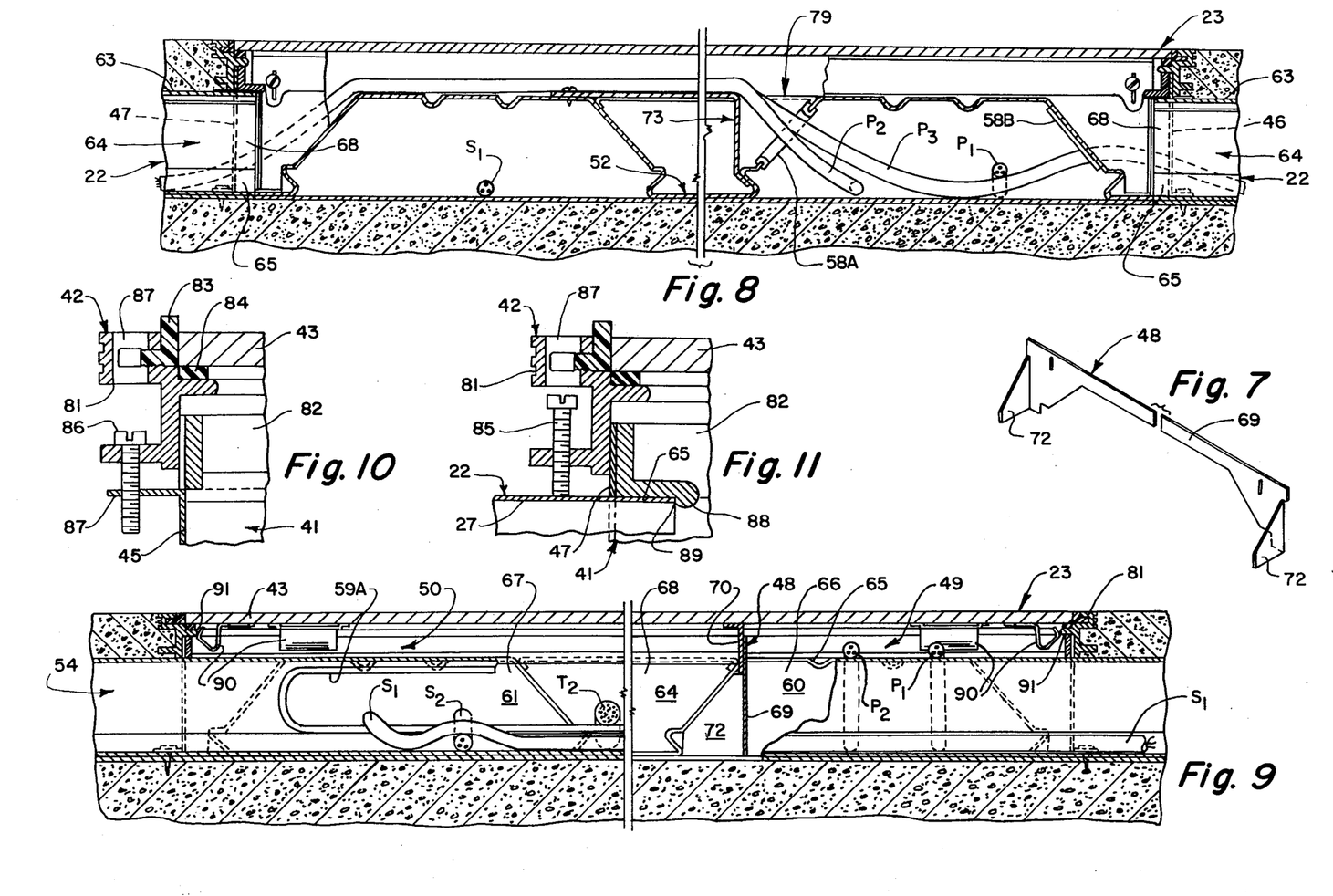
FIG. 7 is a broken isometric view of a partition.
FIG. 8 is a cross-sectional view taken along the line 8—8 of FIG. 6.
FIG. 9 is a cross-sectional view taken along the line 9—9 of FIG. 6.
FIG. 10 is a fragmentary cross-sectional view taken along the line 10—10 of FIG. 6.
FIG. 11 is a fragmentary cross-sectional view taken along the line 11—11 of FIG. 6.

Referring again to FIGS. 3 and 6, each of the feeder units 22 presents first and second feeder passageways 60, 61 disposed on opposite sides of a second lengthwise trough 62. Third capping means 63 encloses the second lengthwise trough 62 of each feeder unit 22 to provide an additional feeder passageway 64. As best shown in FIG. 8, each of the third capping means 63 terminates flush with the end segment 65 of the feeder unit 22. The feeder passageways 60, 61 and 64 (FIGS. 3 and 9) include open ends 66, 67 and 68, respectively, presented within the enclosure 23. It will be observed that the first compartment 49 communicates solely with the first feeder passageways 60 through the open ends 66 thereof, and that the second compartment 50 communicates with the second feeder passageways 61 and with the additional feeder passageways 64 through the open ends 67, 68 thereof.

Figure 12:
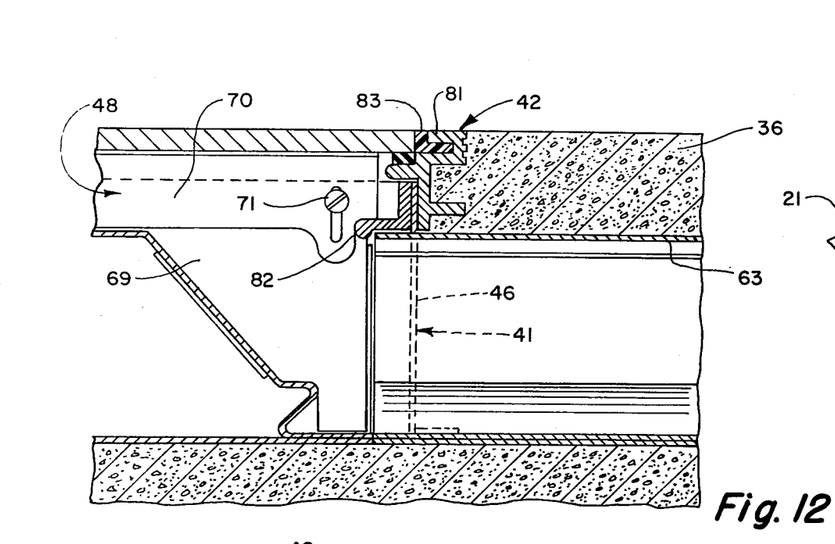
FIG. 12 is a cross-sectional view taken along the line 12—12 of FIG. 6.

The partition 48 (FIGS. 9 and 12) is vertically adjustable and comprises a lower segment 69 and an upper segment 70 secured to the lower segment 69 by fasteners 71 (FIG. 12). Capping ends 72 (FIG. 7) are provided at the opposite ends of the lower segment 69. When the partition 48 is installed (FIG. 9), the capping ends 72 are positioned to preclude communication between the first feeder passageway 60 and the second compartment 50.

Figure 14:
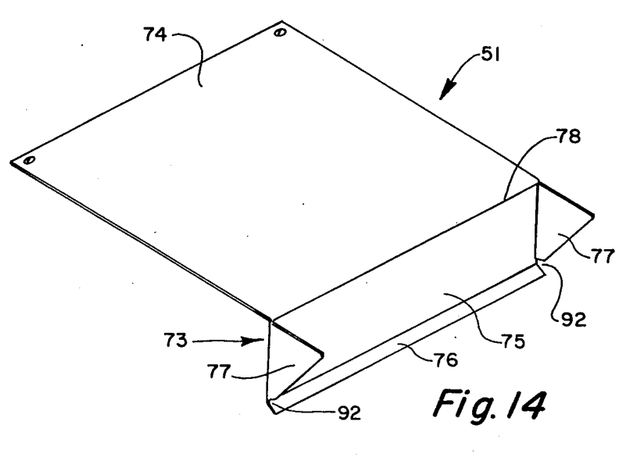
FIG. 14 is a perspective view illustrating isolator means.
Figure 15:
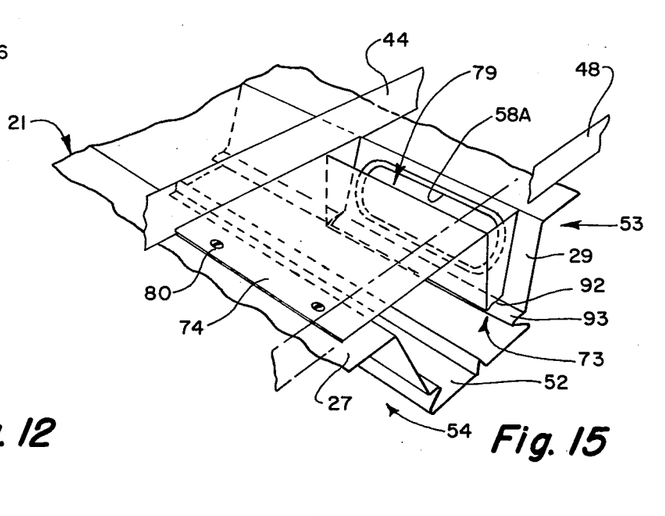
FIG. 15 is a fragmentary perspective view illustrating the isolator means of FIG. 14 installed in a common lengthwise trough of a main unit.

The isolator means 51 (FIG. 14) comprises enclosure means 73 and an integral plate 74. The enclosure means 73 includes a rear wall 75 having an inturned lower edge 76 and opposite closure ends 77. The lower ends of the closure ends 77 cooperate with the inturned lower edge 76 to provide slot-like formations 92. When installed (FIG. 15), the enclosure means 73 extends into the common lengthwise trough 52 and is retained in position by a lengthwise rib 93 formed in the web 29, which is engaged in the slot-like formations 92. The enclosure means 73 isolates a trough portion 79 of the common lengthwise trough 52 which includes the access opening 58 in the first main passageway 53. The plate 74 caps that portion of the common lengthwise trough 52 exposed between the partition 48 and the end wall 44. The plate 74 may be secured to the adjacent crest 27 by fasteners 80.

The frame means 42 (FIGS. 10 to 13) includes a vertically adjustable external frame 81 surrounding the boundary enclosure 41 and an internal frame 82 disposed within the boundary enclosure 41. The frames 81, 82 may be fabricated from aluminum by extrusion processes.

The external frame 81 is provided with a reversible tile stop element 83 and a gasket 84. The tile stop element 83 is reversible between a flush position (FIGS. 12, 13) which permits screeding of the concrete 36 flush with the enclosure 23; and an upstanding position (FIGS. 10, 11) wherein it segregates the tile (not illustrated) covering the upper surfaces of the cover plate 43 from that covering the surrounding concrete layer.

For the purpose of illustration, the external frame 81 is shown in FIGS. 10 and 11 in a vertically adjusted position. The external frame 81 may be vertically adjusted by leveling screws 85 engaging the upper surface of the crests 27 to position the same flush with the intended level of the covering layer 36 of concrete. The external frame 81 is secured in vertically adjusted and leveled position by fasteners 86 (FIG. 10) which are threadedly engaged in tabs 87 provided at the corners of the boundary enclosure 41 as shown in FIG. 3. Access for turning the screws 85, 86 is provided through openings 87 (FIGS. 10, 11) formed in the external frame 81.

The internal frame 82 is secured by any suitable means to the boundary enclosure 41. A downwardly extending rib 88 (FIG. 11) is provided along those sides of the internal frame 82 which extend parallel with the end segments 65 of the feeder units 22. The ribs 88 extend below an upper edge 89 presented by the feeder units 82 and serve to protect the insulation of wiring pulled through the feeder passageways 60, 61, 64.

The cover plate 43 is releasably retained in position by hidden (FIGS. 9 and 13) retaining means in the form of spring clips 90 positioned to engage projecting edges 91 provided by the external frame 81.

Figures 16, 17, 18:
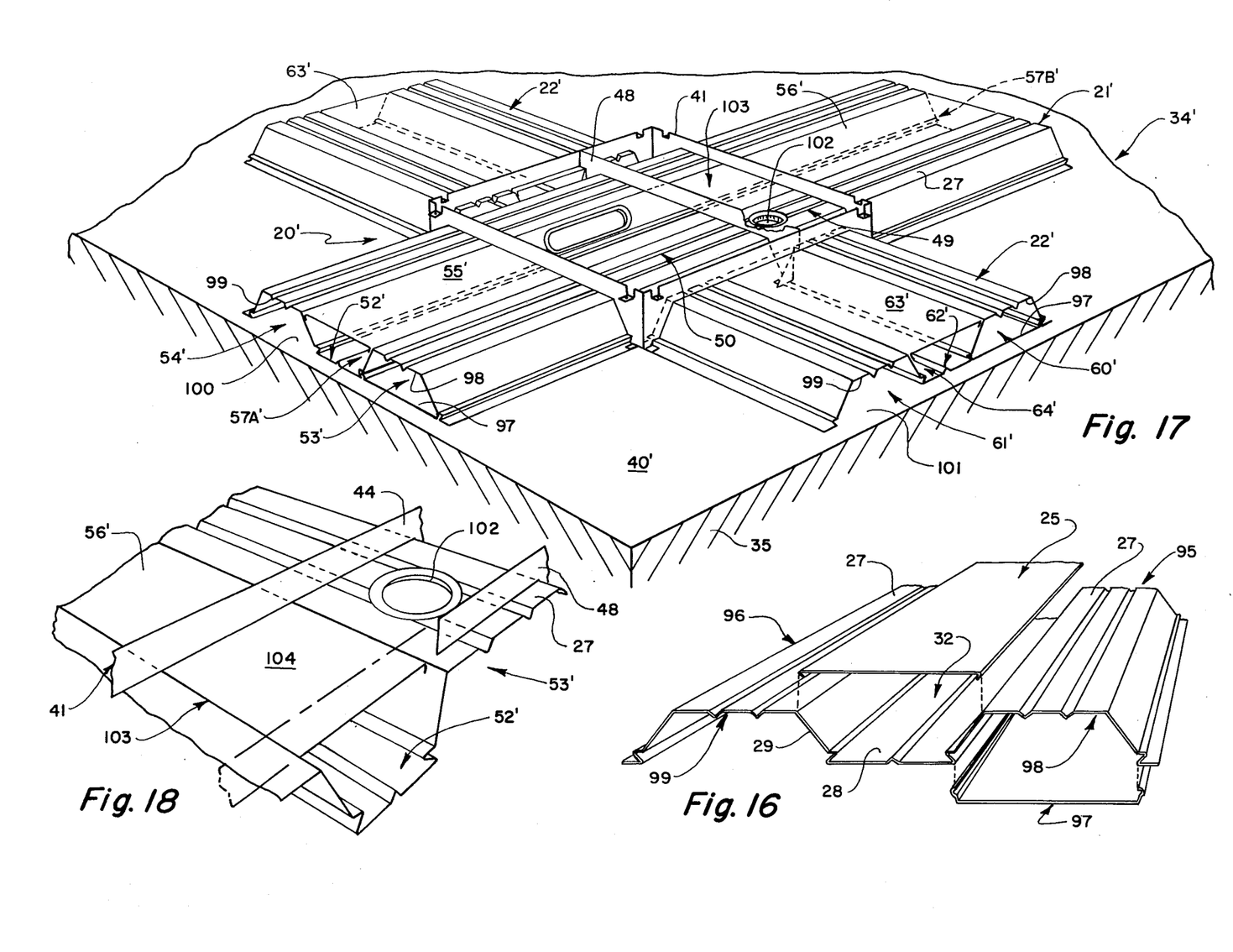
FIG. 16 is a fragmentary perspective view illustrating an alternative metal raceway unit and capping means useful as the main and feeder units of the present distributing system.
FIG. 17 is a fragmentary isometric view illustrating an alternative arrangement of the present distributing system incorporating the metal raceway unit and capping means of FIG. 16.
FIG. 18 is a fragmentary isometric view illustrating alternative isolator means employed in the arrangement of FIG. 17.

Alternative embodiments of this invention are illustrated in FIGS. 16 to 18. Corresponding numerals will be employed to identify corresponding parts heretofore described.

Alternatively, the main and feeder units may comprise a raceway section 95 (FIG. 16) comprising a corrugated element 96 in the form of a continuous metal sheet and closure means 97. For a complete description of the raceway section 95, reference is directed to copending patent application Ser. No. 874,535 filed Feb. 2, 1978, and assigned to the assignee of the present invention. For the purposes of this invention it is believed sufficient to state that the corrugated element 96 presents alternating crests 27 and valleys 28 connected by inclined webs 29; at least one lengthwise trough 52 defined by one of the valleys 28 and the confronting webs 29 connected thereto; and at least two lengthwise flutes 98, 99, each defined by one of the crests 27 and the confronting webs 29 connected thereto. The closure means 97 is adapted to enclose the lengthwise flute 98 thereby to provide an enclosed passageway. The capping means 25, as described above, encloses the lengthwise trough 32 thereby to provide an additional passageway. The lengthwise flute 99 is adapted to cooperate with a surface extending between the lower edges of the confronting webs 29 to form another wiring passageway.

FIG. 17 illustrates a floor structure 34' incorporating a distribution system 20' assembled from a main unit 21' and feeder units 22'. The main and feeder units 21', 22' each comprise one of the raceway sections 95 of FIG. 16. The main unit 21' presents first and second main passageways 53', 54' and additional main passageways 57A' and 57B'. The first main passageway 53' is defined by the first flute 98 and the closure means 97. The additional main passageways 57A', 57B' are defined by the first and second capping means 55', 56' and the subjacent portions of the common lengthwise trough 52' as described above. The second main passageway 54' is defined by the second lengthwise flute 99 and that surface portion 100 of the upper surface 40' of the substructure 35 which encloses the second lengthwise flute 99.

Each of the feeder units 22' presents first and second feeder passageways 60', 61' and an additional feeder passageway 64'. The first feeder passageway 60' is defined by the first flute 98 and the closure means 97. The additional feeder passageway 64' is defined by a third capping means 63' and the subjacent lengthwise trough 62'. The second feeder passageway 61' is defined by the second lengthwise flute 99 and that surface portion 101 of the upper surface 40' of the substructure 35 which encloses the second lengthwise flute 99.

Alternatively, the first feeder passageway 53' may be provided with a grommeted opening 102 (FIGS. 17, 18) formed in the crest 27. The grommeted opening 102 establishes communication between the first main passageway 53' and the first compartment 49. In this embodiment, isolator means 103 (FIG. 18) which isolates the first compartment 49 from the common lengthwise trough 52' comprises an end portion 104 of the second capping means 56'. The end portion 104 extends beneath the end wall 44 of the boundary enclosure 41 and terminates substantially flush with the partition 48.

The manner in which the wiring of various electrical services, for example, power (P), signal (S) and telephone (T), is distributed will now be described with reference to FIGS. 6, 8 and 9.

It will be observed in FIGS. 6 and 8 that all of the high-voltage power wiring (P) may extend through one or more of the following: the first main passageway 53, the first compartment 49, the first feeder passageway 60 of the feeder units 22. For example, power wiring $P_1$ extends through the first main passageway 53 and bypasses the enclosure 23. The power wiring $P_2$, $P_3$ may exit from the opening 58A into the trough portion 79 provided by the isolator means 51 and then into the first compartment 49. The power wiring $P_2$, $P_3$ is maintained completely segregated from the common lengthwise trough 52 through which telephone wiring $T_1$ extends.

All of the low-voltage telephone wiring (T) may extend through one or more of the following: the additional main passageways 57A, 57B, the second compartment 50, the second main passageway 54 by way of the access openings 59A, 59B, the additional feeder passageways 62 of the feeder units 22. The telephone wiring $T_1$, $T_2$ may constitute large diameter wiring containing, for example, 100 pairs of telephone conductors. Such large diameter telephone wiring has a limited, that is, a mimimum, bending radius, for example, 9 inches (229 mm). It will be observed in FIG. 6 that the access openings 59A, 59B comprise relatively long openings. Consequently, the telephone wiring, for example, the telephone wiring $T_2$, may readily be directed from the additional main passageway 57A through the access openings 59A, 59B to the additional feeder passageway 64 without approaching the minimum bending radius.

All of the low-voltage signal wiring (S) may extend through one or more of the following: the second main passageways 54, the second compartment 50, the second feeder passageways 61 of the feeder units 22.

While the signal wiring (S) and the telephone wiring (T) may be intermingled in the second compartment 50, they remain completely segregated from the power wiring (P).

What is claimed is:

1. An electrical wiring distributing floor structure comprising:

a substructure presenting an upper surface;

an uninterrupted main unit supported on said upper surface and having opposite longitudinal edges, said main unit including alternating crests and valleys connected by webs and presenting at least one lengthwise trough defined by one of said valleys and the confronting webs connected thereto;

spaced generally parallel main passageways defined in part by said main unit;

a feeder unit supported on said upper surface and extending transversely away from said main unit;

spaced generally parallel feeder passageways defined in part by said feeder unit and terminating in open feeder passageway ends adjacent to one of said longitudinal edges;

a housing having a removable cover, enclosing a full-width segment of said main unit and said open feeder passageway ends, said housing having opposed sidewalls extending across said full-width segment in unobstructing relation with said lengthwise trough;

a covering layer of concrete surrounding said housing;

a partition extending transversely of said full-width segment in unobstructing relation with said lengthwise trough, said partition dividing the interior of said housing into a first compartment communicating with one of said feeder passageways of said feeder unit and a second compartment communicating with the others of said feeder passageways of said feeder unit;

a first of said main passageways having a first access opening establishing communication with said first compartment;

a second of said main passageways having a second access opening establishing communication with said second compartment;

first and second capping means enclosing those portions of a common lengthwise trough on opposite sides of said housing thereby to provide substantially unobstructed additional main passageways communicating with said second compartment; and isolator means extending horizontally between the crests on opposite sides of said common lengthwise trough, isolating said first compartment from said common lengthwise trough.

2. The floor structure of claim 1 wherein said first access opening is formed in that web of said first of said main passageways which resides within said common lengthwise trough; and said isolator means comprises enclosure means extending into said common lengthwise trough and along one side thereof isolating a trough portion which includes said first access opening, and a plate extending from an upper edge of said enclosure means and capping said common lengthwise trough.

3. The floor structure of claim 1 wherein each of the confronting webs of said common lengthwise trough constitutes one of the webs of the first and second of said main passageways.

4. The floor structure of claim 1 wherein said main unit comprises
a corrugated upper metal sheet presenting said crests, said valleys and said webs; and
a correlative lower metal sheet secured to said upper metal sheet along contiguous portions thereof and cooperating therewith to define said main passageways.

5. The floor structure of claim 1 wherein said main unit comprises
a corrugated element in the form of a continuous metal sheet presenting at least two lengthwise flutes each defined by one of said crests and the confronting webs connected thereto; and
capping means enclosing one of said lengthwise flutes to define said first of said main passageways;
said second of said main passageways being defined by a second of said lengthwise flutes and that portion of said upper surface enclosing the same.

6. The floor structure of claim 5 wherein said substructure comprises a structural slab.

7. The floor structure of claim 5 wherein said substructure comprises a compacted layer of sand, earth or stone, and a vapor barrier covering said compacted layer.

8. The floor structure of claim 1 wherein
said feeder unit includes alternating crests and valleys connected by webs and presenting second lengthwise troughs each defined by one of said valleys and the confronting webs connected thereto; and including
third capping means enclosing that portion of one of said second lengthwise troughs extending outwardly beyond said housing thereby to provide a substantially unobstructed additional feeder passageway communicating with said second compartment.

9. The floor structure of claim 8 wherein said feeder unit comprises
a corrugated upper metal sheet presenting said crests, said valleys and said webs, and
a correlative lower metal sheet secured to said upper metal sheet along contiguous portions thereof and cooperating therewith to define said feeder passageways.

10. The floor structure of claim 8 wherein said feeder unit comprises
a corrugated element in the form of a continuous metal sheet presenting at least two lengthwise flutes each defined by one of said crests and the confronting webs connected thereto; and
second capping means enclosing one of said lengthwise flutes to define a first of said feeder passageways;
second of said feeder passageways each being defined by a second of said lengthwise flutes and that portion of said upper surface enclosing the same.

11. The floor structure of claim 10 wherein each of the confronting webs of said one of said second lengthwise troughs constitutes one of the webs of the first and second of said feeder passageways.

12. The floor structure of claim 10 wherein said substructure comprises a structural slab.

13. The floor structure of claim 10 wherein said substructure comprises a compacted layer of sand, earth or stone, and a vapor barrier covering said compacted layer.

14. An electrical wiring distributing floor structure comprising:
a substructure presenting an upper surface;
an uninterrupted main unit supported on said upper surface and having opposite longitudinal edges, said main unit including alternating crests and valleys connected by webs and presenting at least one lengthwise trough defined by one of said valleys and the confronting webs connected thereto;
spaced generally parallel main passageways defined in part by said main unit;
a feeder unit supported on said upper surface and extending transversely away from said main unit;
spaced generally parallel feeder passageways defined in part by said feeder unit and terminating in open feeder passageway ends adjacent to one of said longitudinal edges;
a housing having a removable cover, enclosing a full-width segment of said main unit and said open feeder passageway ends;
a covering layer of concrete surrounding said housing;
a partition extending transversely of said full-width segment and dividing the interior of said housing into a first compartment communicating with one of said feeder passageways of said feeder unit and a second compartment communicating with the others of said feeder passageways of said feeder unit;
a first of said main passageways having a first access opening formed in the crest thereof establishing communication with said first compartment;
a second of said main passageways having a second access opening establishing communication with said second compartment;
first and second capping means enclosing those portions of a common lengthwise trough on opposite sides of said housing thereby to provide substantially unobstructed additional main passageways communicating with said second compartment; and
isolator means extending horizontally between the crests on opposite sides of said common lengthwise trough, isolating said first compartment from said common lengthwise trough, said isolator means comprising an extension of one of said capping means.

* * * * *